United States Patent
Chiu et al.

(10) Patent No.: US 11,372,282 B2
(45) Date of Patent: Jun. 28, 2022

(54) BACKLIGHT MODULE AND DISPLAY DEVICE

(71) Applicant: Coretronic Corporation, Hsin-Chu (TW)

(72) Inventors: Ta-Hsiang Chiu, Hsin-Chu (TW); Wei-Hsuan Cheng, Hsin-Chu (TW); Cheng-Hsien Chou, Hsin-Chu (TW); Chen-Hung Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/334,798

(22) Filed: May 31, 2021

(65) Prior Publication Data
US 2021/0389629 A1  Dec. 16, 2021

(30) Foreign Application Priority Data
Jun. 10, 2020  (CN) .......................... 202021051831.9

(51) Int. Cl.
*G02F 1/13357* (2006.01)
*G02F 1/1335* (2006.01)

(52) U.S. Cl.
CPC .. *G02F 1/133606* (2013.01); *G02F 1/133603* (2013.01); *G02F 1/133614* (2021.01)

(58) Field of Classification Search
None
See application file for complete search history.

(56) References Cited

FOREIGN PATENT DOCUMENTS

| CN | 107203064 A | * | 9/2017 | ........... G02F 1/1335 |
| CN | 110264868 A | | 9/2019 | |
| CN | 110579833 A | | 12/2019 | |

* cited by examiner

*Primary Examiner* — Britt D Hanley

(57) ABSTRACT

A backlight module includes a back plate, an optical element set, a wavelength conversion film, a light source, and an ink layer. The optical element set is disposed on the back plate and has a first surface, a second surface and at least one end surface. The first surface faces the back plate and is opposite to the second surface. The at least one end surface is connected to the first surface and the second surface. The wavelength conversion film is disposed on the back plate. The light source is adapted to provide light, and the light is transmitted to the wavelength conversion film and the optical element set. The ink layer is disposed on the at least one end surface of the optical element set. A display device is further provided. The backlight module and the display device may reduce the phenomenon of blue edge caused by light leakage.

16 Claims, 6 Drawing Sheets

BACKLIGHT MODULE AND DISPLAY DEVICE

CROSS-REFERENCE TO RELATED APPLICATION

This application claims the priority benefit of China application 202021051831.9, filed on 2020 Jun. 10. The entirety of the above-mentioned patent application is hereby incorporated by reference herein and made a part of this specification.

FIELD OF THE INVENTION

The invention relates to a light source module and a display device, and more particularly to a backlight module and a display device adopting the backlight module.

BACKGROUND OF THE INVENTION

At present, the liquid crystal display devices have been widely used as the display parts of electronic products. With the demand for thinner and lighter electronic products, the frame of the liquid crystal display device is designed to be narrower, and the light source module in the liquid crystal display device is also required to have a narrower frame.

However, in the case of a narrower frame, the frame may no longer provide a function of shielding unintended light. Therefore, the light source module may cause light leakage or light halo around the frame. When a blue light-emitting diode (LED) is used as the light source, the wavelength conversion film will have a low conversion efficiency of blue light at the edge due to the thin coating thickness of the phosphor or the packaging problem, and blue light leakage or blue light halo occurs around the display area, so the image of the liquid crystal display device has a problem of blue edge.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a backlight module, which may reduce the phenomenon of blue edge caused by light leakage.

The invention provides a display device, which may reduce the problem of blue edge of the displayed image.

Other advantages and objects of the invention may be further illustrated by the technical features broadly embodied and described as follows.

In order to achieve one or a portion of or all of the objects or other objects, a backlight module provided in an embodiment of the invention includes a back plate, an optical element set, a wavelength conversion film, a light source, and an ink layer. The optical element set is disposed on the back plate and has a first surface, a second surface and at least one end surface. The first surface faces the back plate and is opposite to the second surface. The at least one end surface is connected to the first surface and the second surface. The wavelength conversion film is disposed on the back plate. The light source is adapted to provide light, and the light is transmitted to the wavelength conversion film and the optical element set. The ink layer is disposed on the at least one end surface of the optical element set.

In order to achieve one or a portion of or all of the objects or other objects, a display device provided in an embodiment of the invention includes a display panel and the above-mentioned backlight module. The display panel is disposed on a light emitting side of the backlight module.

In the backlight module of the embodiment of the invention, by disposing the ink layer on the at least one end surface of the optical element set, when light is transmitted to an edge of the backlight module, part of the light not converted by the wavelength conversion film will be absorbed by the ink layer. When the light source emits blue light, the configuration of the ink layer may reduce the phenomenon of blue edge caused by light leakage of the backlight module. Since the display device of the embodiment of the invention uses the above-mentioned backlight module, the problem of blue edge of a displayed image may be reduced.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
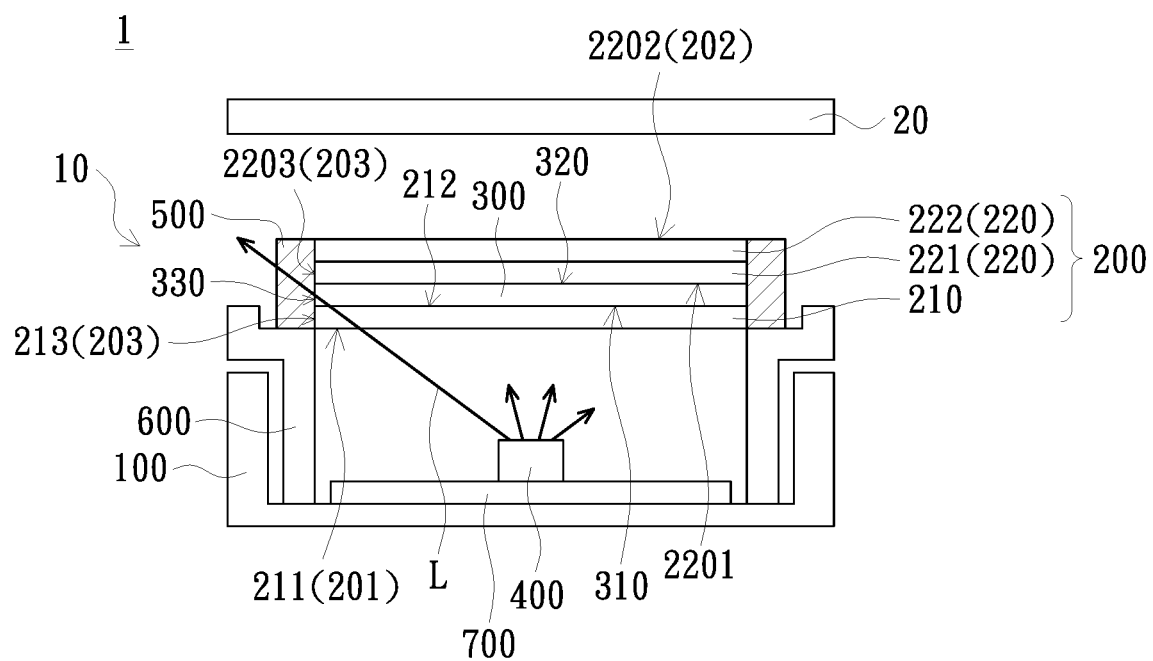
FIG. 1 is a cross-sectional schematic diagram of a display device of one embodiment of the invention.
Figure 2A:
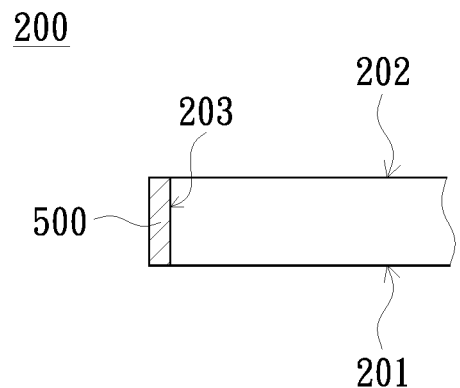
FIG. 2A is a cross-sectional schematic diagram of the ink layer of FIG. 1 being disposed on an end surface of the optical element set.
Figure 2B:
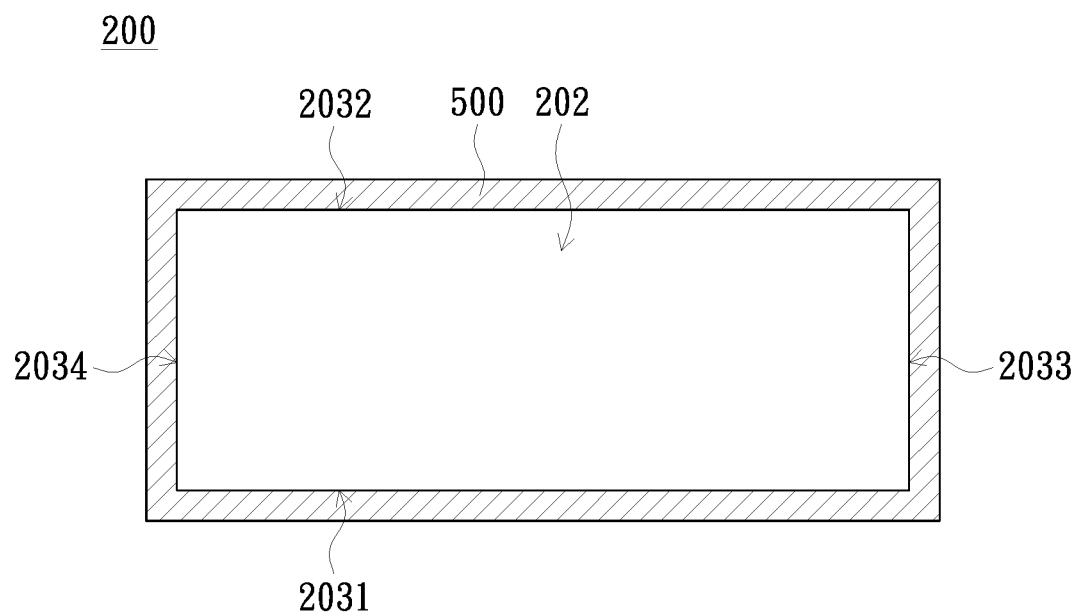
FIG. 2B is a schematic top view of the ink layer of FIG. 1 being disposed on an end surface of the optical element set.

FIG. 1 is a cross-sectional schematic diagram of a display device of one embodiment of the invention. FIG. 2A is a cross-sectional schematic diagram of the ink layer in FIG. 1 being disposed on an end surface of the optical element set. FIG. 2B is a schematic top view of the ink layer in FIG. 1 being disposed on an end surface of the optical element set. Referring to FIG. 1 first, a display device 1 of the embodiment includes a backlight module 10 and a display panel 20. The backlight module 10 includes a back plate 100, an optical element set 200, a wavelength conversion film 300, a light source 400, and an ink layer 500. The optical element set 200 is disposed on the back plate 100, and has a first surface 201, a second surface 202 and at least one end surface 203. The first surface 201 faces the back plate 100 and is opposite to the second surface 202. The at least one end surface 203 is connected to the first surface 201 and the second surface 202. The wavelength conversion film 300 is disposed on the back plate 100. The light source 400 is adapted to provide light L, and the light L is transmitted to the wavelength conversion film 300 and the optical element set 200. The ink layer 500 is, for example, disposed on the at least one end surface 203 of the optical element set 200. The display panel 20 is disposed on a light emitting side of the backlight module 10. Specifically, the display panel 20 is, for example, disposed on a side of the optical element set 200 or the wavelength conversion film 300 away from the light source 400, and is adapted to receive the light L emitted from the optical element set 200 or the wavelength conversion film 300.

The light source 400 may be a light-emitting diode, but may also be other types of light-emitting elements. In addition, the light source 400 may be a light-emitting chip that is cut directly from a wafer and not encapsulated, such as a light-emitting diode chip. For example, the light-emitting diode chip is a grain level nitride light-emitting diode chip having a dominant wavelength capable of emitting blue light, which is adapted to provide blue light, but the invention is not limited thereto. FIG. 1 only shows one light source 400, but the invention does not particularly limit the quantity of the light source 400.

The wavelength conversion film 300 is adapted to convert and adjust the color of the incident light L. For example, the wavelength conversion film 300 has a red-green light conversion material. When the light L emitted by the light source 400 is blue light, part of the light L passes through the wavelength conversion film 300 and is converted into red light and green light, and the converted red light and green light are mixed with part of the unconverted light L (blue light) to form white light. The foregoing is only an embodiment of the invention, and is not intended to limit the color of the light L. The material of the wavelength conversion film 300 is, for example, quantum dot (QD), fluoride phosphor, oxynitride phosphor (KSF and β-Sialon), YAG, etc., but is not limited thereto.

Referring to FIG. 2A and FIG. 2B, the ink layer 500 is, for example, disposed by coating or spraying ink. In the embodiment, the ink layer 500 is, for example, only disposed on the at least one end surface 203 of the optical element set 200. The at least one end surface 203 of the optical element set 200 includes, for example, a first end surface 2031, a second end surface 2032, a third end surface 2033, and a fourth end surface 2034. The first end surface 2031 is opposite to the second end surface 2032; and the third end surface 2033 and the fourth end surface 2034 are opposite to each other and are adjacent to and connected to the first end surface 2031 and the second end surface 2032. The ink layer 500 is, for example, disposed on all of the first end surface 2031, the second end surface 2032, the third end surface 2033, and the fourth end surface 2034, as shown in FIG. 2B, but not limited thereto. The arrangement of the ink layer 500 may be adjusted according to actual needs. In addition, the ink layer 500 is, for example, disposed on the entire surface of the at least one end surface 203 of the optical element set 200, but the invention is not particularly limited thereto. In other embodiments, according to different requirements of the light emitting effect, the ink layer 500 may be disposed on part of the surface of the at least one end surface 203 of the optical element set 200, or an ink concentration of the ink layer 500 may be adjusted.

Referring to FIG. 1 again, the backlight module 10 of the embodiment is, for example, a direct type backlight module, and the optical element set 200 of the embodiment includes, for example, a diffusion plate 210 and an optical film set 220. The optical film set 220 includes at least one optical film. In the direct type backlight module 10 of the embodiment, the light source 400 is, for example, disposed on the back plate 100 and located between the back plate 100 and the wavelength conversion film 300. In the embodiment, the wavelength conversion film 300 is, for example, disposed between the diffusion plate 210 and the optical film set 220 of the optical element set 200, but is not limited thereto. For example, the wavelength conversion film 300 may also be disposed between the light source 400 and the optical element set 200, or between the at least one optical film of the optical film set 220, or may be disposed on the optical element set 200 (i.e., the side of the optical element set 200 away from the back plate 100).

The at least one optical film of the optical film set 220 is, for example, a polarization enhancement film, a diffusion film, a prism sheet or a composite prism sheet, but not limited thereto. The invention does not limit the quantity of the at least one optical film, and the quantity of the at least one optical film may be one or more. In the embodiment, the at least one optical film of the optical film set 220 including two optical films 221, 222 are taken as an example. In addition, the optical films 221, 222 may be different types depending on the function of the optical film.

The optical film set 220 has a first sheet surface 2201, a second sheet surface 2202 and at least one sheet end surface 2203. The first sheet surface 2201 is opposite to the second sheet surface 2202, and the first sheet surface 2201, for example, faces the light source 400. The at least one sheet end surface 2203 is connected to the first sheet surface 2201 and the second sheet surface 2202. The at least one end surface 203 of the optical element set 200 includes the at least one sheet end surface 2203 of the optical film set 220. In the embodiment, the optical films 221, 222 of the optical film set 220 are sequentially stacked on the wavelength conversion film 300. The first sheet surface 2201 of the optical film set 220 is, for example, the bottom surface of the optical film 221 stacked at the bottom, and the second sheet surface 2202 of the optical film set 220 is, for example, the top surface of the optical film 222 stacked at the top. In addition, under the configuration of the embodiment, the top surface of the optical film 222 is also the second surface 202 of the optical element set 200. The ink layer 500 is disposed on the at least one sheet end surface 2203 of the optical film set 220, specifically, the ink layer 500 is, for example, disposed on the at least one sheet end surface 2203 of at least one of the optical films 221, 222 of the optical film set 220.

Because the optical element set 200 of the embodiment further includes the diffusion plate 210, the ink layer 500 may also be disposed on an end surface of the diffusion plate 210. The diffusion plate 210 has a first plate surface 211, a second plate surface 212 and at least one plate end surface 213. The first plate surface 211 is opposite to the second plate surface 212, and the first plate surface 211, for example, faces the light source 400. The at least one plate end surface 213 is connected to the first plate surface 211 and the second plate surface 212. In the configuration of the embodiment, the first plate surface 211 of the diffusion plate 210 is also the first surface 201 of the optical element set 200. The at least one end surface 203 of the optical element set 200 includes the at least one plate end surface 213 of the diffusion plate 210, and the ink layer 500 is, for example, further disposed on the at least one plate end surface 213 of the diffusion plate 210, but is not limited thereto. In another embodiment, the ink layer 500 may be only disposed on the at least one plate end surface 213 of the diffusion plate 210 of the optical element set 200.

In addition to the optical element set 200, the ink layer 500 may also be disposed on the wavelength conversion film 300. The wavelength conversion film 300 has a first film surface 310, a second film surface 320 and at least one film end surface 330. The first film surface 310 is opposite to the second film surface 320, and the first film surface 310, for example, faces the light source 400. The at least one film end surface 330 is connected to the first film surface 310 and the second film surface 320. The ink layer 500 is, for example, further disposed on the at least one film end surface 330 of the wavelength conversion film 300. Specifically, the ink layer 500 may be disposed on the end surface of at least one of the diffusion plate 210, the optical film set 220 and the wavelength conversion film 300, but is not limited thereto. The above-mentioned configuration of the ink layer 500 may also be applied to the wavelength conversion film 300.

The color of the ink layer 500 may be, for example, yellow, but is not limited thereto. For example, the wavelength conversion film 300 has a yellow light conversion material. When the light L is blue light, the color of the ink layer 500 may be yellow. The yellow ink layer 500 allows yellow light to pass therethrough and reduces the passing of non-yellow light. Therefore, part of the light L (blue light) transmitted to the edge of the backlight module 10 without being converted by the wavelength conversion film 300 would be absorbed by the ink layer 500. After the yellow light formed by the wavelength conversion film 300 is emitted from the edge together with other unconverted blue light, a color mixing effect is produced on a viewer, and the light emitted from the edge would be regarded as white light, thereby reducing the phenomenon of blue edge caused by light leakage of the light source module 10. The light color and ink layer color used in the embodiment may be adjusted according to design requirements, and the invention is not particularly limited.

The backlight module 10 further includes, for example, a frame 600 and a substrate 700. The frame 600 is disposed on the back plate 100, and the optical element set 200, the wavelength conversion film 300 and the light source 400 are disposed in the frame 600. The substrate 700 is disposed between the back plate 100 and the light source 400, and the light source 400 is, for example, disposed on the substrate 700. The substrate 700 is, for example, a circuit board, provided with circuits and electronic elements for driving the light source 400. The surface of the substrate 700 has, for example, a reflection function, which may reflect the light L into the optical element set 200 or the wavelength conversion film 300 to improve the light utilization efficiency, but is not limited thereto. In another embodiment, a reflective sheet may also be disposed on the substrate 700 to achieve the effect of reflecting light. In addition, in order to clearly describe the elements of the backlight module 10, the backlight module 10 and the display panel 20 are drawn separately in the embodiment. In another embodiment, the frame 600 may also be used to clamp the display panel 20.

In the embodiment, the display panel 20 is, for example, a liquid crystal display panel. The type of the liquid crystal display panel is, for example, a transmissive display panel or a transflective display panel, but not limited thereto.

In the backlight module 10 of the embodiment, the ink layer 500 is disposed on the at least one end surface 203 of the optical element set 200. Thus, when light L is transmitted to the edge of the backlight module 10, the part of the light not converted by the wavelength conversion film 300 will be absorbed by the ink layer 500. Therefore, when the light source 400 emits blue light, the configuration of the ink layer 500 may reduce the phenomenon of blue edge caused by light leakage of the backlight module 10. Since the display device 1 of the embodiment uses the above-mentioned backlight module 10, the problem of blue edge of a displayed image may be reduced.

Figure 3:
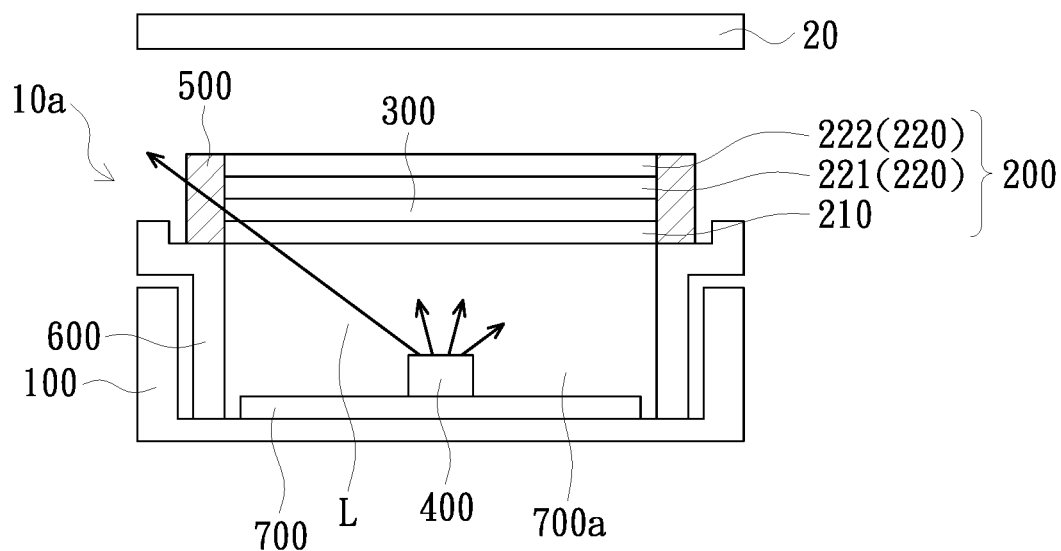
FIG. 3 is a cross-sectional schematic diagram of a display device of another embodiment of the invention.

FIG. 3 is a cross-sectional schematic diagram of a display device of another embodiment of the invention. Referring to FIG. 3, the display device 1a of the embodiment is similar in structure and advantages to the display device 1. The backlight module 10a of the display device 1a is a direct type backlight module, which is the same as the backlight module 10 of the above-mentioned display device 1. The only difference is that in the display device 1a of the embodiment, the backlight module 10a further includes a light board 700a. The light source 400 is disposed in the light board 700a, and the optical element set 200 and the wavelength conversion film 300 are disposed on the light board 700a. The light board 700a is, for example, a secondary lens, which is adapted to adjust a traveling direction of the light L emitted by the light source 400. In the display device 1, a diffusion plate 210 is used to bear the optical film set 220 and the wavelength conversion film 300. In other unshown embodiments in which the backlight module 10a uses the light plate 700a, because the light plate 700a may also achieve the function of bearing the optical film set 220 and the wavelength conversion film 300, there is no need to dispose the diffusion plate 210 between the light source 400 and the optical film set 220. For example, the diffusion plate 210 may be disposed on the optical film set 220 instead.

Figure 4:
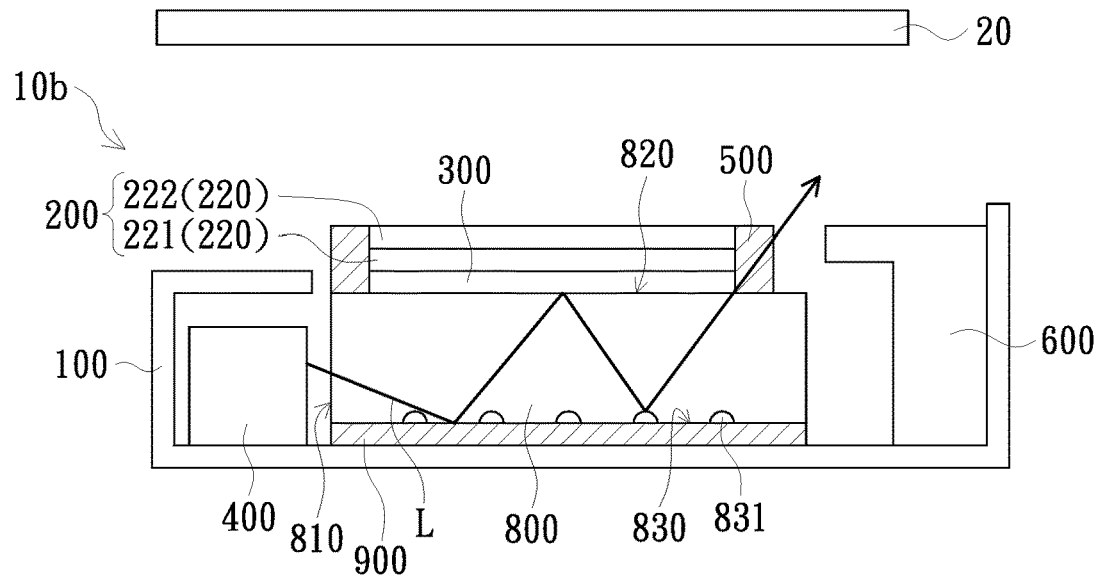
FIG. 4 is a cross-sectional schematic diagram of a display device of another embodiment of the invention.
Figure 5:
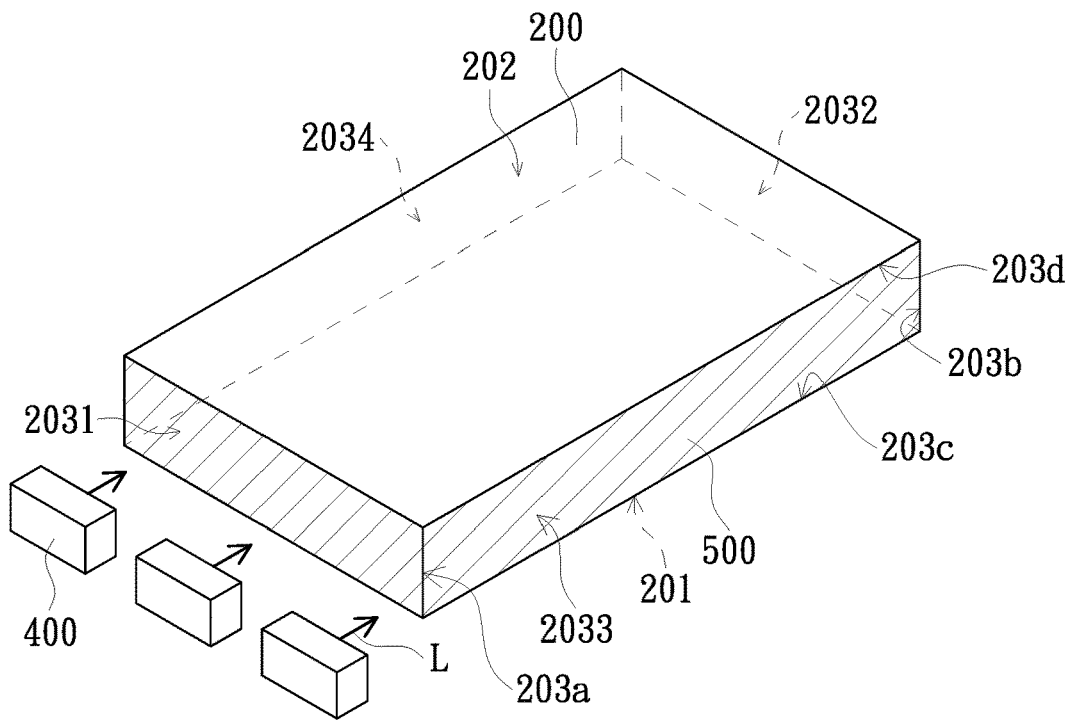
FIG. 5 is a three-dimensional schematic diagram of a light source and an optical element set of one embodiment of the invention.

FIG. 4 is a cross-sectional schematic diagram of a display device of another embodiment of the invention. FIG. 5 is a three-dimensional schematic diagram of a light source and an optical element set of one embodiment of the invention. Referring to FIG. 4 first, the display device 1b of the embodiment is similar in structure and advantages to the display device 1, and only the main differences in structure are described below. In the display device 1b of the embodiment, the backlight module 10b is, for example, an edge type backlight module, and the backlight module 10b further includes a light guide plate 800 and a reflective sheet 900. The light guide plate 800 is disposed between the back plate 100 and the wavelength conversion film 300. The light guide plate 800 has a light incident surface 810, a light emitting surface 820 and a bottom surface 830. The light incident surface 810 is adjacent to and connected to the light emitting surface 820 and the bottom surface 830. The light incident surface 810 faces the light source 400; the light emitting surface 820 faces the wavelength conversion film 300; and the light emitting surface 820 is opposite to the bottom surface 830. The bottom surface 830 has, for example, a plurality of diffusion microstructures 831. The diffusion microstructures 831 may be dots or other microstructures that may diffuse light, so that the light transmitted in the light guide plate 800 may be emitted from the light emitting surface 820, but is not limited thereto. The reflective sheet 900 is disposed beside the bottom surface 830 of the light guide plate 800 to reflect the light L leaking from the bottom surface 830 of the light guide plate 800 back into the light guide plate 800 to improve light utilization efficiency.

The light source 400 of the embodiment is, for example, a light-emitting element including a plurality of point light sources (as shown in FIG. 5), where the point light sources are, for example, light-emitting diodes. Specifically, the light-emitting diodes are, for example, the grain level nitride light-emitting diode dies having a dominant wavelength capable of emitting blue light, but not limited thereto. The light source 400 may also be other types of light-emitting elements, such as a lamp tube, and the invention does not limit the type of the light source.

The difference from the display device 1 is that in the configuration of the display device 1b of the embodiment, the intensity of the light received by the optical element set 200 gradually decreases from a side close to the light source 400 to a side away from the light source 400. Therefore, the ink layer 500 disposed on the at least one end surface 203 of the optical element set 200 may be adjusted. Referring to FIG. 2B and FIG. 5, the first end surface 2031 is, for example, facing the light source 400, and the second end surface 2032 is, for example, away from the light source 400. When the light L irradiates the third end surface 2033 and the fourth end surface 2034, the intensity of the light would gradually decrease from a side close to the light source 400 to a side away from the light source 400. Hereinafter, the third end surface 2033 will be used to illustrate how to adjust the ink layer 500.

Figure 6A:
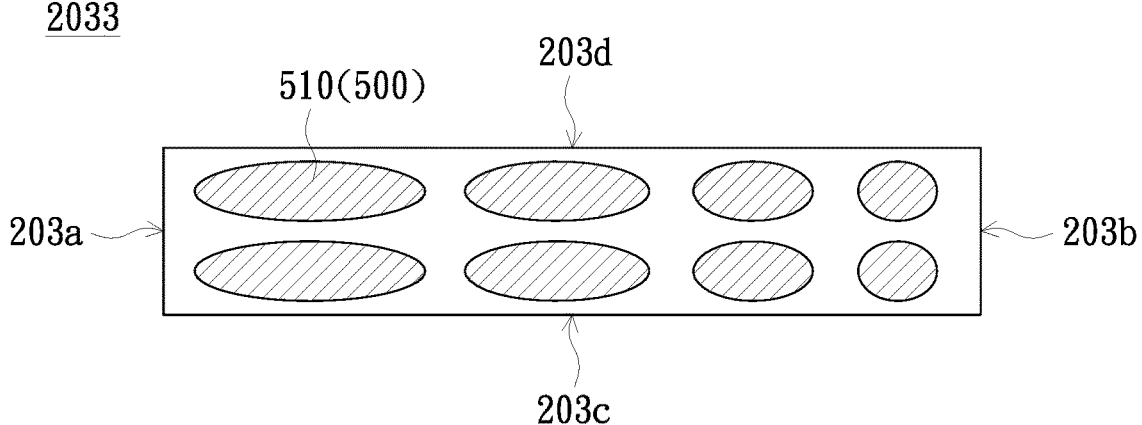
FIGS. 6A to 6C are schematic diagrams of different embodiments of a third end surface of an optical element set of the invention.
Figure 6B:
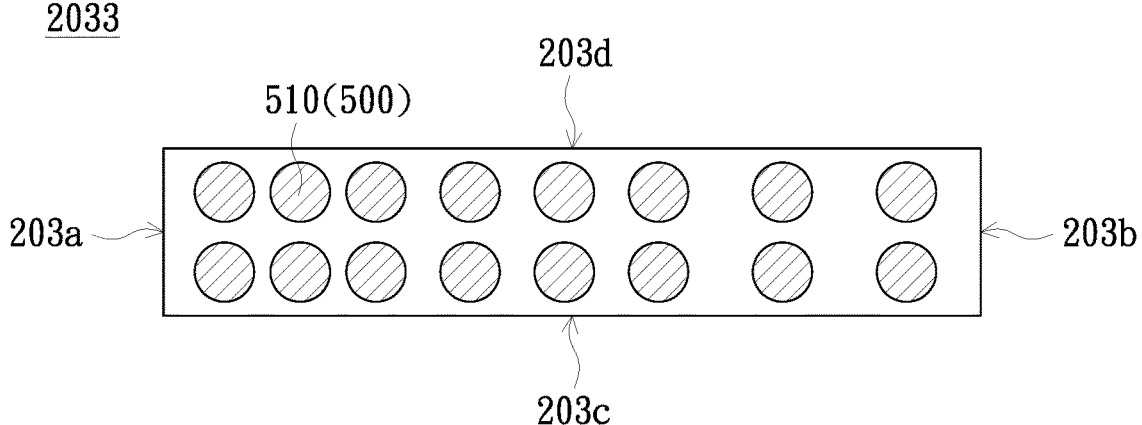
Figure 6C:
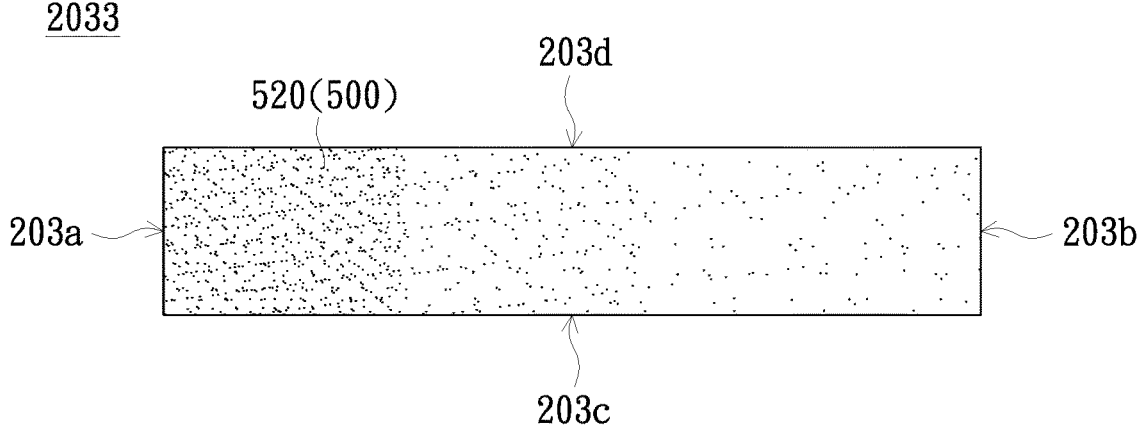

FIGS. 6A to 6C are schematic diagrams of different embodiments of a third end surface of an optical element set of the invention. Referring to FIG. 5 and FIGS. 6A to 6C, the at least one end surface 203 of the optical element set 200 (the third end surface 2033 is taken as an example) includes a first side 203a, a second side 203b, a third side 203c, and a fourth side 203d. The first side 203a is opposite to the second side 203b. The third side 203c and the fourth side 203d are opposite to each other and are adjacent to and connected to the first side 203a and the second side 203b. The third side 203c is further adjacent to and connected to the first surface 201; and the fourth side 203d is further adjacent to and connected to the second surface 202. The first side 203a is adjacent to the light source 400. In the embodiment of FIG. 6A, the ink layer 500 includes, for example, a plurality of patterns 510, and the areas of the plurality of patterns 510 gradually decrease in a direction from the first side 203a to the second side 203b. Specifically, the closer to the light source 400 (the intensity of the light is higher), the more ink needs to be disposed to achieve the effect of absorbing light. Alternatively, the farther away from the light source 400 (the intensity of the light is lower), the fewer ink is required to be disposed.

Similar to the above-mentioned principle, in the embodiment of FIG. 6B, the ink layer 500 includes, for example, a plurality of patterns 510. The areas of the plurality of patterns 510 are the same, and a distribution density of the plurality of patterns 510 gradually decreases in a direction from the first side 203a to the second side 203b. In the embodiments of FIGS. 6A and 6B, the plurality of patterns 510 is all circular or elliptical, but the shape of the patterns 510 is not particularly limited in the invention.

Similar to the above-mentioned principle, in the embodiment of FIG. 6C, the ink layer 500 includes a plurality of ink particles 520, and a distribution density of the plurality of ink particles 520 gradually decreases in a direction from the first side 203a to the second side 203b. The above-mentioned embodiments are also applicable to the fourth end surface 2034 of the optical element set 200.

Figure 7:
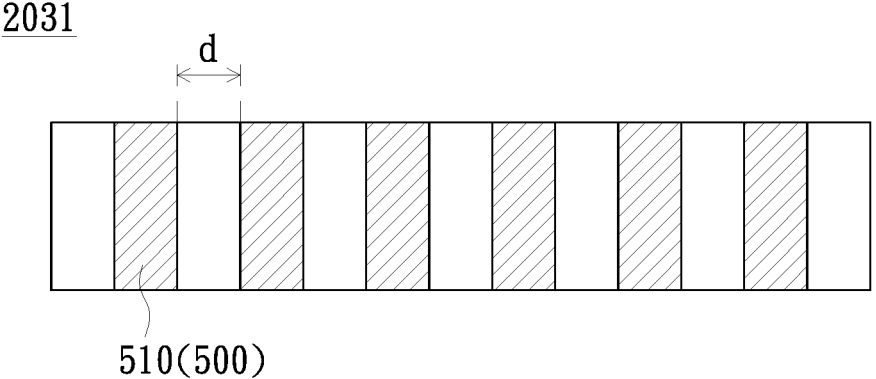
FIG. 7 is a schematic diagram of a first end surface of an optical element set of another embodiment of the invention.

FIG. 7 is a schematic diagram of a first end surface of an optical element set of another embodiment of the invention. Refer to FIG. 5 and FIG. 7. Compared with the third end surface 2033, the intensity of the light received by the first end surface 2031 is the same on the entire surface, but the ink concentration may still be adjusted by adjusting the plurality of patterns 510 of the ink layer 500. For example, the areas of the plurality of patterns 510 of the ink layer 500 are the same, and the plurality of patterns 510 has the same interval d. The pattern 510 in FIG. 7 is a rectangle as an example, but is not limited thereto. For example, the pattern 510 of the ink layer 500 disposed on the first end surface 2031 in the embodiment of FIG. 7 may be circular or elliptical as shown in the embodiment of FIG. 6A and FIG. 6B, and the patterns 510 are distributed with a uniform density. In addition, in the embodiment of FIG. 6A and FIG. 6B, the patterns 510 of the ink layer 500 disposed on the third end surface 2033 may be rectangle as shown in the embodiment of FIG. 7, and the ink concentration may be controlled by adjusting the area of the rectangle or a distance of the interval d (a distribution density of the rectangle). Generally speaking, the ink layer 500 is, for example, disposed on the entire surface of the at least one end surface 203 of the optical element set 200. However, when the ink concentration has reached the lowest value feasible in the process method but a further lower ink concentration is required based on the optical effect requirements, the ink concentration may be controlled by adjusting the area of the plurality of patterns 510 or the distance of the interval d. In the case where the ink layer 500 includes a plurality of ink particles 520, the ink concentration may be reduced as long as the distribution density of the plurality of ink particles 520 is reduced. The above-mentioned embodiment of the first end surface 2031 is also applicable to the second end surface 2032 of the optical element set 200. In addition, the above-mentioned embodiments of FIGS. 6A to 6C and FIG. 7 are also applicable to the at least one film end surface 330 of the wavelength conversion film 300.

In summary, in the backlight module of the embodiment of the invention, by disposing the ink layer on the at least one end surface of the optical element set, when light is transmitted to an edge of the backlight module, part of the light not converted by the wavelength conversion film will be absorbed by the ink layer. When the light source emits blue light, the configuration of the ink layer may reduce the phenomenon of blue edge caused by light leakage of the backlight module. Since the display device of the embodiment of the invention uses the above-mentioned backlight module, the problem of blue edge of a displayed image may be reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first surface, the second surface, the first side, the second side, the third side, the fourth side, the first end surface, the second end surface, the third end surface, the fourth end surface, the first plate surface, the second plate surface, the first sheet surface, the second sheet surface, the first film surface and the second film surface are only used for distinguishing various elements and do not limit the number of the elements.

What is claimed is:

1. A backlight module, comprising a back plate, an optical element set, a wavelength conversion film, a light source, and an ink layer, wherein:
   the optical element set is disposed on the back plate and has a first surface, a second surface and at least one end surface, the first surface faces the back plate and is opposite to the second surface, and the at least one end surface is connected to the first surface and the second surface;
   the wavelength conversion film is disposed on the back plate;
   the light source is adapted to provide light, and the light is transmitted to the wavelength conversion film and the optical element set; and
   the ink layer is only disposed on the at least one end surface of the optical element set without overlapping with the first surface and the second surface.

2. The backlight module according to claim 1, wherein the optical element set comprises a diffusion plate and an optical film set, and the light source is disposed on the back plate and located between the back plate and the wavelength conversion film.

3. The backlight module according to claim 2, wherein the diffusion plate has a first plate surface, a second plate surface and at least one plate end surface, the first plate surface is opposite to the second plate surface, the at least one plate end surface is connected to the first plate surface and the second plate surface, wherein the at least one end surface of the optical element set comprises the at least one plate end surface of the diffusion plate, and the ink layer is disposed on the at least one plate end surface of the diffusion plate.

4. The backlight module according to claim 2, wherein the optical film set has a first sheet surface, a second sheet surface and at least one sheet end surface, the first sheet surface is opposite to the second sheet surface, the at least one sheet end surface is connected to the first sheet surface and the second sheet surface, wherein the at least one end surface of the optical element set comprises the at least one sheet end surface of the optical element set, and the ink layer is disposed on the at least one sheet end surface of the optical element set.

5. The backlight module according to claim 1, wherein the at least one end surface of the optical element set comprises a first end surface, a second end surface, a third end surface, and a fourth end surface, the first end surface is opposite to the second end surface, the third end surface and the fourth end surface are opposite to each other and are adjacent to and connected to the first end surface and the second end surface, wherein the ink layer is disposed on all of the first end surface, the second end surface, the third end surface, and the fourth end surface.

6. The backlight module according to claim 1, further comprising a light guide plate, disposed between the back plate and the wavelength conversion film, wherein the light guide plate has a light incident surface and a light emitting surface, the light incident surface is adjacent to and connected to the light emitting surface, the light incident surface faces the light source, and the light emitting surface faces the wavelength conversion film.

7. The backlight module according to claim 1, wherein the ink layer comprises a plurality of patterns or a plurality of ink particles.

8. The backlight module according to claim 7, wherein the ink layer comprises a plurality of patterns, and there is an interval between each two adjacent patterns in the plurality of patterns.

9. The backlight module according to claim 1, wherein the ink layer is disposed on an entire surface of the at least one end surface of the optical element set.

10. The backlight module according to claim 1, wherein the wavelength conversion film has a first film surface, a second film surface and at least one film end surface, the first film surface is opposite to the second film surface, the at least one film end surface is connected to the first film surface and the second film surface, wherein the ink layer is further disposed on the at least one film end surface of the wavelength conversion film.

11. The backlight module according to claim 1, wherein a color of the ink layer comprises yellow.

12. The backlight module according to claim 1, wherein the light provided by the light source is blue light.

13. A backlight module, comprising a back plate, an optical element set, a wavelength conversion film, a light source, and an ink layer, wherein:
the optical element set is disposed on the back plate and has a first surface, a second surface and at least one end surface, the first surface faces the back plate and is opposite to the second surface, and the at least one end surface is connected to the first surface and the second surface;
the wavelength conversion film is disposed on the back plate;
the light source is adapted to provide light, and the light is transmitted to the wavelength conversion film and the optical element set; and
the ink layer is disposed on the at least one end surface of the optical element set,
wherein the ink layer comprises a plurality of patterns, the at least one end surface of the optical element set comprises a first side, a second side, a third side, and a fourth side, the first side is opposite to the second side, the third side and the fourth side are opposite to each other and are adjacent to and connected to the first side and the second side, the third side is further adjacent to and connected to the first surface, the fourth side is further adjacent to and connected to the second surface, wherein the first side is adjacent to the light source, areas of the plurality of patterns gradually decrease in a direction from the first side to the second side.

14. A backlight module, comprising a back plate, an optical element set, a wavelength conversion film, a light source, and an ink layer, wherein:
the optical element set is disposed on the back plate and has a first surface, a second surface and at least one end surface, the first surface faces the back plate and is opposite to the second surface, and the at least one end surface is connected to the first surface and the second surface;
the wavelength conversion film is disposed on the back plate;
the light source is adapted to provide light, and the light is transmitted to the wavelength conversion film and the optical element set; and
the ink layer is disposed on the at least one end surface of the optical element set,
wherein the ink layer comprises a plurality of patterns, the at least one end surface of the optical element set comprises a first side, a second side, a third side, and a fourth side, the first side is opposite to the second side, the third side and the fourth side are opposite to each other and are adjacent to and connected to the first side and the second side, the third side is further adjacent to and connected to the first surface, the fourth side is further adjacent to and connected to the second surface, wherein the first side is adjacent to the light source, areas of the plurality of patterns are the same, and a distribution density of the plurality of patterns gradually decreases in a direction from the first side to the second side.

15. A backlight module, comprising a back plate, an optical element set, a wavelength conversion film, a light source, and an ink layer, wherein:
the optical element set is disposed on the back plate and has a first surface, a second surface and at least one end surface, the first surface faces the back plate and is opposite to the second surface, and the at least one end surface is connected to the first surface and the second surface;
the wavelength conversion film is disposed on the back plate;
the light source is adapted to provide light, and the light is transmitted to the wavelength conversion film and the optical element set; and
the ink layer is disposed on the at least one end surface of the optical element set,
wherein the ink layer comprises a plurality of ink particles, the at least one end surface of the optical element set comprises a first side, a second side, a third side, and a fourth side, the first side is opposite to the second side, the third side and the fourth side are opposite to each other and are adjacent to and connected to the first side and the second side, the third side is further adjacent to and connected to the first surface, the fourth side is further adjacent to and connected to the second surface, wherein the first side is adjacent to the light source, and a distribution density of the plurality of ink particles gradually decreases in a direction from the first side to the second side.

16. A display device, comprising:
a backlight module, comprising a back plate, an optical element set, a wavelength conversion film, a light source, and an ink layer, wherein:
the optical element set is disposed on the back plate and has a first surface, a second surface and at least one end surface, the first surface faces the back plate and is opposite to the second surface, and the at least one end surface is connected to the first surface and the second surface;
the wavelength conversion film is disposed on the back plate;
the light source is adapted to provide light, and the light is transmitted to the wavelength conversion film and the optical element set; and
the ink layer is only disposed on the at least one end surface of the optical element set without overlapping with the first surface and the second surface; and
a display panel, disposed on a light emitting side of the backlight module.

* * * * *